United States Patent [19]
Keeney

[11] 4,082,104
[45] Apr. 4, 1978

[54] PRESSURE RELIEF VALVE

[75] Inventor: Joseph G. Keeney, Town of Tonawanda, N.Y.

[73] Assignee: C. H. Heist Corporation, Clearwater, Fla.

[21] Appl. No.: 698,087

[22] Filed: Jun. 21, 1976

[51] Int. Cl.² ............................................. F16K 17/14
[52] U.S. Cl. ..................................... 137/71; 137/271; 137/508
[58] Field of Search ................... 137/68 R, 69, 70, 71, 137/269, 271; 220/89 A; 102/25

[56] References Cited

U.S. PATENT DOCUMENTS

| | | | |
|---|---|---|---|
| 966,999 | 8/1910 | Carssow | 137/71 X |
| 3,016,015 | 1/1962 | Filstrup | 137/70 X |
| 3,087,426 | 4/1963 | Foster | 102/25 |

*Primary Examiner*—Martin P. Schwadron
*Assistant Examiner*—Richard Gerard
*Attorney, Agent, or Firm*—Joseph P. Gastel

[57] ABSTRACT

A pressure relief valve including a housing, first and second bores in axial alignment in the housing, first and second plungers in the first and second bores, respectively, a third bore in the first plunger, a seal between the first and second plungers with the end of the second plunger being located in communication with the third bore, a first conduit for placing the housing in communication with a source of fluid pressure to expose the first plunger thereto and also expose a portion of the second plunger thereto through the third bore, a shear pin for holding the second plunger in position whereby the fluid pressure on the first and second plungers is exerted on the shear pin, a plurality of radial bores in the housing proximate the seal between the first and second plungers, and a second conduit in communication with the radial bores for conducting high pressure fluid from the housing upon shearing of the shear pin and after movement of the second plunger away from the first plunger.

23 Claims, 9 Drawing Figures

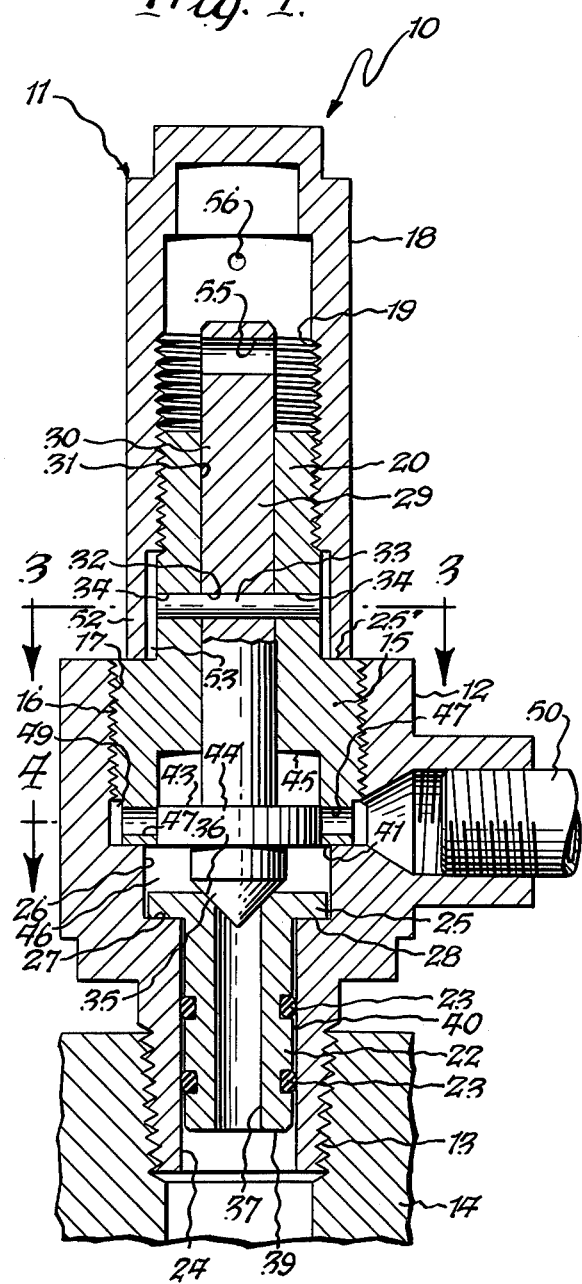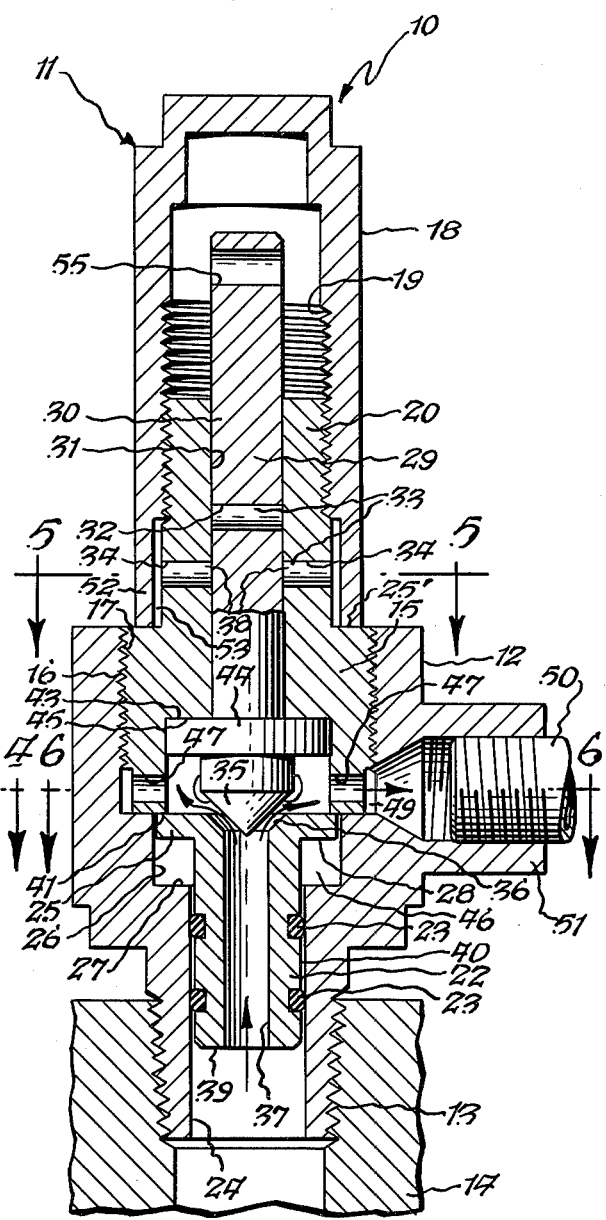

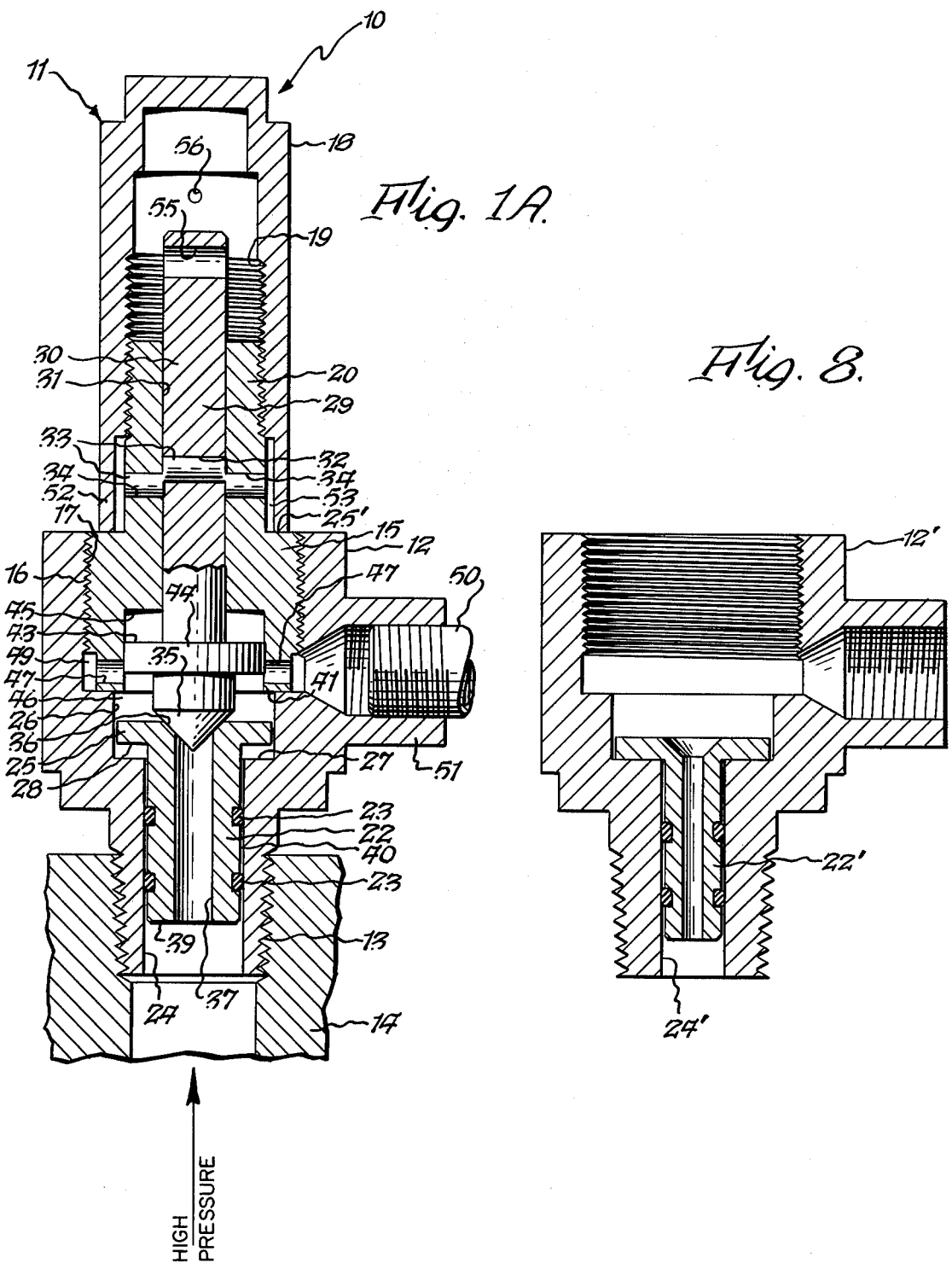

PRESSURE RELIEF VALVE

The present invention relates to an improved pressure relief valve construction.

By way of background, pressure relief valves utilizing shearable pins are known in the art and are exemplified by U.S. Pat. Nos 2,092,793, 2,304,491, 2,587,933, 2,589,144 and 3,443,572. However, high pressure relief valves commonly used in the past were extremely heavy in that they weighed between 15 and 20 pounds. This large mass was necessary because when the shear pin fractured, a plunger mounted within the valve produced a relatively high impact. The weight of the prior art valves was concentrated in the body thereof for the purpose of absorbing the impact of the plunger. The improved pressure relief valve of the present invention overcomes the foregoing deficiency of prior art pressure relief valves in that it is capable of relieving high pressures while weighing only a small fraction of the prior art valves. This is possible because the construction of the present pressure relief valve produces a combination of very small plunger travel and substantially instantaneous dumping of fluid pressure so that the impact which is produced is sufficiently low so that the valve housing does not have to be massive.

The present invention relates to a pressure relief valve comprising a housing, first bore means in said housing, first plunger means having first surface means in effective sliding engagement with said first bore means, second bore means in said first plunger means, third bore means in said housing, second plunger means having second surface means in effective sliding engagement with said third bore means, sealing means effectively located between said second bore means and said second plunger means, frangible means effectively coupled between said second plunger means and said housing to retain said sealing means in engagement against the force of high pressure fluid exerted against said first and second plunger means, and conduit means in communication with said housing proximate said sealing means for conducting high pressure fluid from said housing upon disengagement of said sealing means resulting from the fracture of said frangible means.

The present invention also relates to a pressure relief valve comprising a housing, bore means in said housing, plunger means in said bore means, tapered head means on said plunger means, seat means in said housing for complementary engagement with said tapered head means, and frangible means coupling said plunger means in said housing with said tapered head means seated in fluid-tight engagement with said seat means.

The present invention also relates to a pressure relief valve comprising housing means, plunger means in said housing means, frangible means for securing said plunger means relative to said housing means, and means for selectively varying the cross sectional area of said plunger means exposed to high pressure fluid, whereby said frangible means may be fractured at different pressures.

The present invention also relates to a pressure relief valve comprising housing means, plunger means in said housing means, pressure receiving surface means on said plunger means, bore means in said housing for effecting communication between said pressure receiving surface means and a source of fluid pressure, holding means for holding said plunger means until a predetermined pressure has been applied to said pressure receiving surface means and thereafter releasing said plunger means, said plunger means comprising first and second plunger members, and means for permitting said first and second plunger members to move independently of each other after termination of holding by said holding means. The various aspects of the present invention will be more fully understood when the following portions of the specification are read in conjunction with the accompanying drawings wherein:

FIG. 1 is a fragmentary cross sectional view of the improved pressure relief valve taken substantially along line 1—1 of FIG. 3 and showing the relief valve before the shear pin therein has been sheared to allow pressure relief;

FIG. 1A is a fragmentary cross sectional view of a portion of FIG. 1 but showing the position of the parts after the plungers have moved but before the pin has been sheared;

FIG. 2 is a view similar to FIG. 1 but showing the position of the various parts after the shear pin has been sheared to permit pressure relief;

FIG. 8 is a view of a pressure end housing portion and plunger arrangement which can be used to replace the existing arrangement on an existing valve to vary the pressure at which it provides relief.

Figure 3:
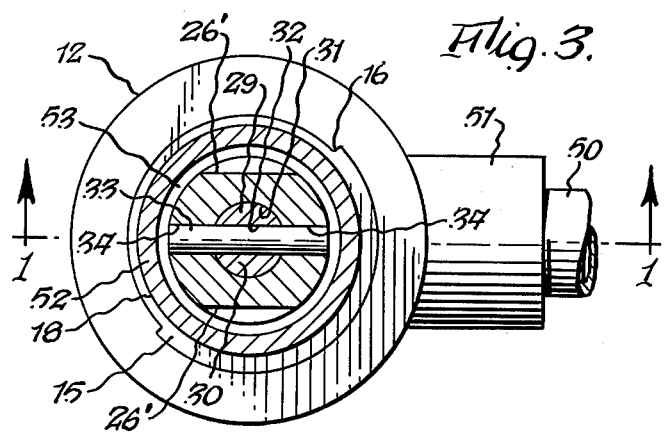
FIG. 3 is a cross sectional view taken substantially along line 3—3 of FIG. 1 and showing the shear pin in unsheared condition.
Figure 4:
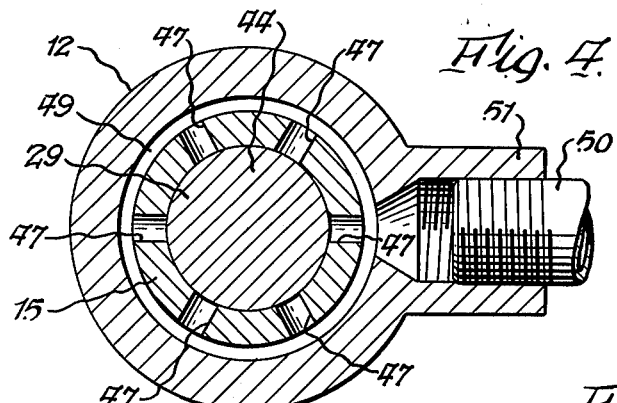
FIG. 4 is a cross sectional view taken substantially along line 4-4 of FIG. 1 and showing the position of one of the plungers relative to the radial pressure relief bores.

The improved pressure relief valve 10 of the present invention includes a housing 11 consisting of three parts, namely, the pressure end housing portion 12 having a threaded end 13 adapted to be screwed into a member 14 which is to be guarded against pressure overloads, a shear body housing portion 15 having threads 16 which are screwed into tapped portion 17 of housing portion 12, and a safety cap housing portion 18 which is internally tapped at 19 for threaded engagement with threaded end portion 20 of shear body housing portion 15.

An annular plunger 22 having spaced O-rings 23 mounted thereon is inserted within bore 24 of housing portion 12. An annular flange 25 at the end of plunger 22 fits into enlarged bore 26 in housing portion 12 with one side thereof adjacent to annular shoulder 27. It will be appreciated that O-rings 23 will provide a fluid seal with bore 24.

Figure 5:
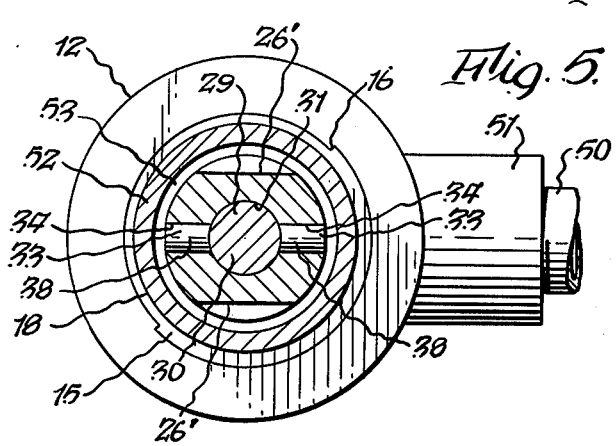
FIG. 5 is a view similar to FIG. 3 but taken along line 5—5 of FIG. 2 and showing the shear pin in sheared condition.

A second plunger 29 includes a cylindrical body portion 30 which is received in bore 31 of housing portion 15. A transverse bore 32 in plunger portion 30 receives shear pin 33 which has its opposite end portions extending through axially aligned bores 34 in housing portion 15. Shear pin 33 is fabricated from relatively soft metal, in this instance drill rod, and it fits loosely in bores 32 and 34. When cap 18 is in position, shear pin 33 cannot fall out of bores 32 and 34. As noted above, the threaded portion 16 of housing portion 15 is threaded into tapped portion 17 of housing portion 12, and when shear pin 33 is intact, as shown in FIG. 1, the conical end face 35 of plunger 29 will be adjacent to its complementary mating surface or seat 36 on plunger 22. To grip housing portion 15 when it is threaded into housing portion 12, flats 26' (FIG. 5) are provided on opposite sides thereof, the flats extending between threaded end portion 20 and shoulder 25'.

Plunger 22 includes a bore 37 therein which permits the high pressure fluid within member 14 to act on the portion of conical face 35 within bore 37, as well as on annular face 39 of plunger 22. The ratio of the area of annular surface 39 to the area of bore 37 must be such that the existence of high pressure within member 14 will cause plunger 22 to shift sufficiently toward plunger 29. Since face 35 cannot move upwardly when shear pin 33 is intact. plunger 22 will be moved into good fluid-tight engagement with conical surface 35. Therefore, it is not necessary that the spacing between side 28 of flange 25 and shoulder 27 be such as to provide a fluid-tight seal therebetween especially considering that O-rings 23 will effect the necessary sealing engagement to prevent high pressure fluid from passing around the outside of plunger 22, that is, between outside surface 40 and cylindrical bore 24.

After the pressure within member 14 exceeds a predetermined value, the combined pressure on annular face 39 and the portion of conical surface 35 within bore 37 will cause plungers 22 and 29 to move upwardly in FIG. 1 with sufficient force to shear pin 33, which thereafter assumes the condition shown in FIG. 2. The annular flange 25 of plunger 22 will move away from shoulder 27, and will abut annular shoulder 41 formed at the end of body portion 15. Thereafter plunger 29 will continue to move until the side 43 of annular flange 44 on plunger 29 moves into abutting engagement with annular shoulder 45 of housing portion 15, and movement of plunger 29 will terminate. It will be appreciated that after pin 33 shears, plungers 22 and 29 are capable of and do move independently. This being the case, the force of impact will be divided between them. In addition, since they do not strike their associated shoulders simultaneously because they have to travel different amounts to reach them, the impacts are sequential, thereby lessening the required mass of the housing to absorb the impacts. In this respect, it can be seen that the axial distance between flange surface 25' and shoulder 41 is less than the axial distance between flange surface 43 and shoulder 45. While a shear pin has been disclosed, it will be appreciated that any other type of shear member, or member which is frangible may be used.

Figure 6:
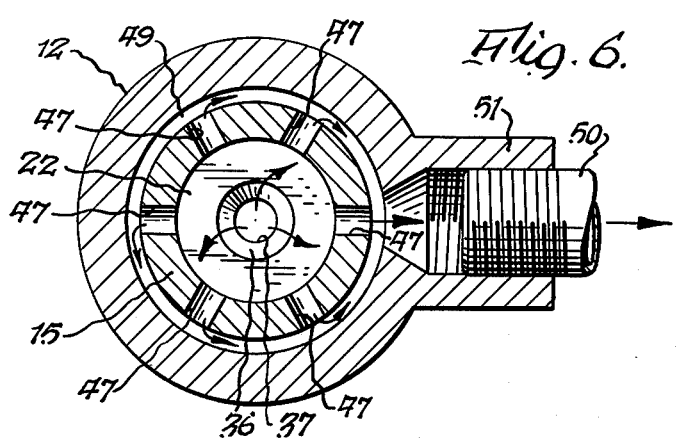
FIG. 6 is a view similar to FIG. 4 and taken along line 6—6 of FIG. 2 and showing the position of the various parts which will permit high pressure fluid to flow through the radial pressure relief bores.
Figure 7:
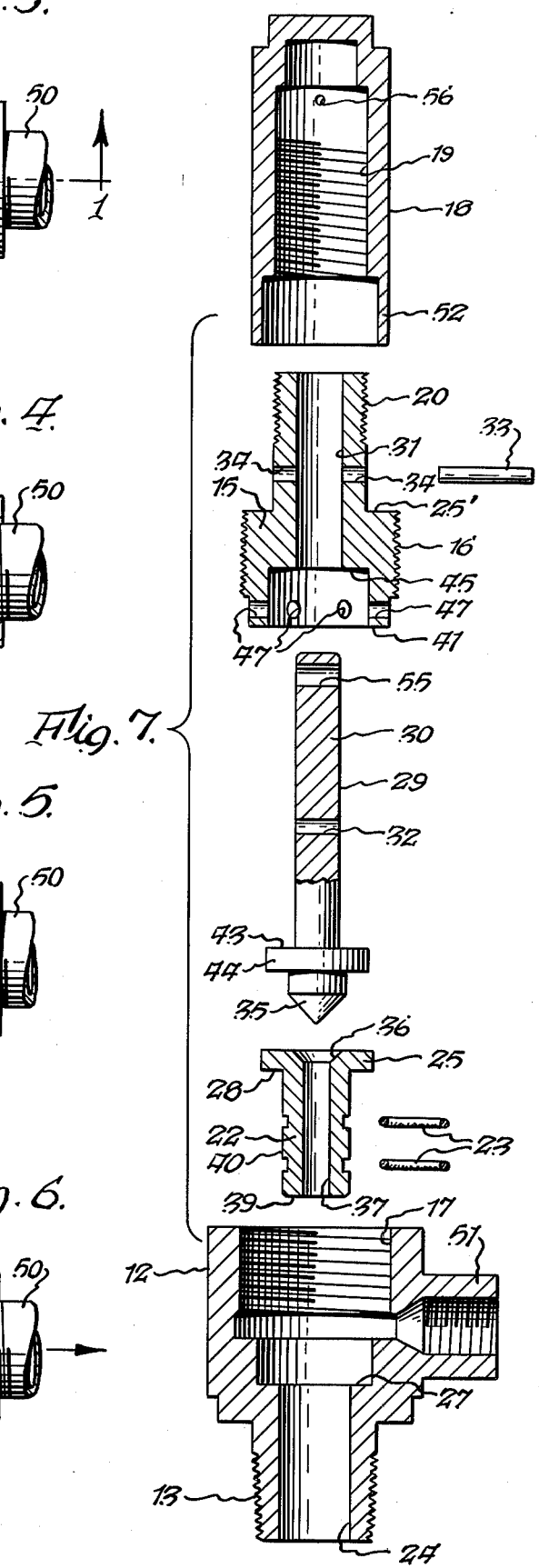
FIG. 7 is an exploded view showing the various parts of the improved pressure relief valve.

The various parts will assume the intermediate condition of FIG. 1A after pin 33 has been partially sheared but before it is severed completely. At this time flange 25 will have moved about one-half the distance between shoulders 27 and 41, and flange 44 will have moved about one-half the distance between its positions of FIG. 1 and FIG. 2. In the intermediate position of FIG. 1A the radial exhaust bores are open and unobstructed so that when conical surface 35 is unseated, as shown in FIG. 2, the high pressure fluid can be dumped immediately. In this respect, the high pressure liquid which enters chamber 26 after shearing of pin 33 will be dumped almost immediately as a result of the communication between chamber 26 and the plurality of radial bores 47 (FIG. 6) is housing portion 15, said radial bores being in communication with annular conduit 49 which is in communication with conduit 50 screwed into boss 51 of housing portion 15, conduit 50 conducting the relieved high pressure fluid to a suitable dumping source. The divergent shape of surface 35 aids in directing the high pressure liquid toward the radial bores 47, thereby further enhancing the speed with which the pressure is dumped. While surface 35 has been shown as conical, it will be appreciated that it can be made in any other analogous shape wherein the surfaces diverge or taper outwardly from the axis of bore 37.

As noted above, the various parts will assume the position of FIG. 1A immediately before shearing. Since flange 25 does not have very far to travel before abutting annular shoulder 41 and since flange 43 does not have very far to travel before abutting annular shoulder 45, they will not have attained sufficient velocity after pin 33 has been sheared so as to produce excessive impacts on shoulders 41 and 45. Therefore, the housing does not have to be massive to absorb such impacts, which, in turn, permits the housing and the entire valve to be very lightweight, namely, between 3 and 4 pounds, whereas prior devices capable of providing pressure relief for pressures of between five and ten thousand pounds per square inch commonly weighed between 15 and 20 pounds. The amount of travel of the flanges between the positions of FIGS. 1A and 2 is about one quarter of an inch, and all parts of the valves shown in the drawings are substantially to scale.

A safety cap 18, as noted above, is threaded onto shear body housing portion 15 and includes annular end portion 52 of reduced cross sectional thickness, which leaves a space 53 between the outer surface of body portion 15 and the inside surface of the reduced end portion 52. This will permit the severed end portions 38 of the sheared pin 33 to move outwardly after the pin is sheared so as not to impede movement of plunger 29 to the right. However, the existence of end portion 52 will prevent the sheared end portions 38 from flying out radially.

A bore 55 is located at the end of plunger 29 for receiving a rod to facilitate rotating plunger 29 about its longitudinal axis, as is required to effect the alignment between bore 32 and bores 34 (FIG. 1).

To reset the valve after the shear pin 33 has been broken, it is merely necessary to unscrew safety cap 18 from body portion 15 and thereafter merely push plunger 29 back into position wherein bore 32 is in alignment with bores 34 in housing portion 15. A new pin can thereafter be inserted through the aligned bores to simultaneously remove the fragmented portions of the previous pin in these bores. Thereafter, safety cap 18 can be reinstalled. It is to be noted that a vent hole 56 is provided in safety cap 18 to prevent air from being trapped in safety cap 18, so that the air will not impede the movement of plunger 29 to the right after shearing. Alternatively, to remove the sheared pin 33, housing portions 12 and 15 can be unscrewed, and plunger 29 removed from bore 31, and the central portion of pin 33 can be removed from bore 32. Thereafter, the parts can be reassembled.

It is to be noted that during the movement of plunger 22 from the position of FIG. 1 to the position of FIG. 2, O-rings 23 never leave bore 24. This being the case, they cannot be blown off of plunger 22. In addition, since O-rings 23 do not have to wipe across any apertures, they will not become scored. In view of the foregoing, O-rings 23 can be used for long periods of time.

It is also to be noted that the same shear body portion 15 and safety cap 18 and plunger 29 can be used with different housing portions 12 so as to vary the pressure at which the pressure relief valve will open. In this respect, by using different housing portions with increased or decreased sizes of the bores 24, different sizes of plungers 22 can be placed in housing portion 12 so as to vary the total force on the combined plungers 22 and 29. In this respect, if the annular end 39 of plunger 22 is increased in size, the total force on combined plungers 22 and 29 will be greater than if annular end 39 was smaller, and therefore the pin 33 will shear where there is a lower pressure within container 14. In conjunction with this aspect of the present invention, it is to be noted that shear pin 33 need only have a single shear strength, that is, different pins with different shear strengths are not necessary for adjusting the pressure at which pin 33 will shear because the force applied to pin 33 is a result of the combined area on annular face 39 and conical face 35, and since, as noted above, the area of annular end 39 can be varied, the total force will vary in direct proportion thereto.

As noted above, in view of the fact that plungers 22 and 29 move relatively small amounts and permit the pressure to be dumped almost instantaneously, the housing portions 12 and 15 which contain the various working parts of valve 10 need not be as massive as prior art structures. In this respect, the entire unit depicted in FIGS. 1 and 2 weighs approximately 3½ pounds and has been effective in releasing at 5,000 psi pressure and at about 12,000 psi pressure, depending on the size of the components. In this respect, to relieve the pressure at 12,000 psi, the bore 24' (FIG. 8) in housing portion 12' was made 0.491 inches in diameter and the bore in plunger 22' was 0.156 inches in diameter; and to relieve the pressure at about 5,000 psi, bore 24 (FIG. 1) was made 0.771 inches in diameter and the bore in plunger 22 was 0.312 inches in diameter. Thus, the only difference between the pressure end housing portions 12 (FIG. 1) and 12' (FIG. 8) which was required to provide pressure relief at different pressures was changing the size of bores 24 and 24' and the plungers 22 and 22', respectively, contained therein. As noted above, the unit of the type depicted in FIG. 1 weighs approximately 3½ pounds whereas prior art units capable of providing pressure relief at the values mentioned above weighed as much as between 15 and 20 pounds, their greater mass being necessary to absorb the impact of the parts after fracture of the shear pin.

The improved valve 10 of the present invention is virtually leak-proof because the sealing between seat 36 on plunger 22 and surface 35 of plunger 29 becomes greater with increases of pressure.

While various embodiments of the present invention have been disclosed, it will be appreciated that the present invention is not limited thereto, but may be otherwise embodied within the scope of the following claims.

What is claimed is:

1. A pressure relief valve for a high pressure fluid source comprising a housing, first bore means in said housing, first plunger means having first surface means in effective sliding engagement with said first bore means, second bore means in said first plunger means, third bore means in said housing in alignment with said first bore means, second plunger means having second surface means in effective sliding engagement with said third bore means, third surface means on said second plunger means, fourth surface means on said first plunger means for selective engagement in sealing relationship with said third surface means, fifth surface means on said second plunger means adjacent said third surface means for blocking continuous flow of high pressure fluid through said second bore means and beyond said fifth surface means when said third and fourth surface means are in said sealing relationship, releasable holding means effectively coupled between said second plunger means and said housing to retain said third and fourth surface means in engagement against the force exerted by high pressure fluid against said first plunger means and said fifth surface of said second plunger means, said holding means being responsive to a predetermined pressure valve of said high pressure source to release said second plunger means, means in said housing for permitting said third and fourth surface means to disengage when there is a release of said holding means, and conducting means for receiving said high pressure fluid from said high pressure fluid source through said second bore means for conducting high pressure fluid from said housing upon disengagement of said third and fourth surface means resulting from release of said holding means.

2. A pressure relief valve as set forth in claim 1 wherein said third and fifth surface means comprises tapered head means, and werein said fourth surface means comprises a mating tapered surface on said first plunger means for engagement by said third surface means of said tapered head means.

3. A pressure relief valve as set forth in claim 2 including first shoulder means on said housing for limiting movement of said first plunger means after release of said holding means, and second shoulder means on said housing for limiting movement of said second plunger means after release of said holding means.

4. A pressure relief valve as set forth in claim 3 including O-ring means on said first surface means.

5. A pressure relief valve as set forth in claim 3 wherein said conducting means comprise a series of radial bore means in said housing in communication with an annular conduit.

6. A pressure relief valve as set forth in claim 4 wherein said conducting means comprise a series of radial bore means in said housing in communication with an annular conduit.

7. A pressure relief valve as set forth in claim 6 including first flange means on said first plunger means for engaging said first shoulder means after release of said holding means, and second flange means on said second plunger means for engaging said second shoulder means after release of said holding means.

8. A pressure relief valve as set forth in claim 1 including first shoulder means on said housing for limiting movement of said first plunger means after release of said holding means, second shoulder means on said housing for limiting movement of second plunger means after release of said holding means, first engagement means on said first plunger means for engaging said first shoulder means, and second engagement means on said second plunger means for engaging said second shoulder means.

9. A pressure relief valve as set forth in claim 8 wherein said first and second plungers travel approximately equal amounts in order to effect engagement between said first and second engagement means with said first and second shoulder means, respectively.

10. A pressure relief valve as set forth in claim 1 wherein said housing comprises a first housing portion for receiving said first plunger means, and a second housing portion for receiving said second plunger means, and means for removably securing said first housing portion to said second housing portion.

11. A pressure relief valve as set forth in claim 10 including first shoulder means on said second housing portion for limiting movement of said first plunger means after release of said holding means, and second shoulder means on said second housing portion for limiting movement of said second plunger means after release of said holding means.

12. A pressure relief valve as set forth in claim 11 wherein said conducting means comprise a series of radial bore means in said second housing portion in communication with an annular conduit.

13. A pressure relief valve as set forth in claim 12 including first flange means on said first plunger means for engaging said first shoulder means, and second flange means on said second plunger means for engaging said second shoulder means.

14. A pressure relief valve as set forth in claim 13 including O-ring means on said first surface means and wherein said third and fifth surface means comprises a conical head on said second plunger means, and wherein said fourth surface means comprises a mating surface for said conical head on said first plunger means.

15. A pressure relief valve as set forth in claim 14 wherein said holding means comprises a shear pin, and a protective cap on said housing for enclosing said shear pin.

16. A pressure relief valve as set forth in claim 10 wherein said third surface means comprises tapered head means on said second plunger means, and wherein said fourth surface means comprises a mating surface on said first plunger means for said tapered head means.

17. A pressure relief valve as set forth in claim 1 wherein said housing comprises a first housing portion for receiving said first plunger means, and a second housing portion for receiving said second plunger means, means for removably securing said first housing portion to said second housing portion, a third housing portion, third plunger means for movement in said third housing portion, means for mounting said third housing portion on said second housing portion after said second housing portion has been removed from said first housing portion, said third plunger means being of a different size than said first plunger means, whereby said holding means can be caused to release a different fluid pressures.

18. A pressure relief valve as set forth in claim 1 wherein said holding means comprises a shear pin.

19. A pressure relief valve as set forth in claim 18 including a protective cap on said housing for enclosing said shear pin.

20. A pressure relief valve comprising housing means, first plunger means having a first fluid pressure effective cross sectional area in said housing means, releasable holding means for securing said first plunger means relative to said housing means, said holding means being responsive to a predetermined pressure value of said high pressure source to release said second plunger means, and second plunger means having a second fluid pressure effective cross sectional area selectively attachable to said housing means to replace said first plunger means for effectively selectively varying the cross sectional area of the plunger means exposed to high pressure fluid, whereby said holding means may be released at different fluid pressures.

21. A pressure relief valve as set forth in claim 20 wherein said housing means includes first housing means, second housing means removably mounted on said first housing means for containing said first plunger means, and third housing means for containing said second plunger means, and means on said third housing means for mounting said third housing means on said first housing means to replace said second housing means.

22. A pressure relief valve for a high pressure fluid source comprising a housing, first bore means in said housing, first plunger means having first surface means in effective sliding engagement with said first bore means, second bore means in said first plunger means, third bore means in said housing in alignment with said first bore means, second plunger means having second surface means in effective sliding engagement with said third bore means, third surface means on said second plunger means, fourth surface means on said first plunger means for selective engagement in sealing relationship with said third surface means, releasable holding means effectively coupled between said second plunger means and said housing to retain said third and fourth surface means in engagement against the force exerted by high pressure fluid against said first plunger means and said second plunger means, said holding means being responsive to a predetermined pressure value of said high pressure source to release said second plunger means, means in said housing for permitting said third and fourth surface means to disengage when there is a release of said holding means, and means for receiving said high pressure fluid from said high pressure fluid source through said second bore means for conducting high pressure fluid from said housing upon disengagement of said third and fourth surface means resulting from release of said holding means, said housing comprising a first housing portion for receiving said first plunger means, and a second housing portion for receiving said second plunger means, means for removably securing said first housing portion to said second housing portion, a third housing portion, third plunger means for movement in said third housing portion, means for mounting said third housing portion on said second housing portion after said second housing portion has been removed from said first housing portion, said third plunger means being of a different size than said first plunger means, whereby said holding means can be caused to release at different fluid pressures.

23. A pressure relief valve comprising a housing, first bore means in said housing, first plunger means having first surface means in effective sliding engagement with said first bore means, second bore means in said first plunger means, third bore means in said housing, second plunger means having second surface means in effective sliding engagment with said third bore means, sealing means effectively located between said second bore means and said second plunger means, releasable holding means effectively coupled between said second plunger means and said housing to retain said sealing means in engagement against the force of high pressure fluid exerted against said first and second plunger means, said holding means being responsive to a predetermined pressure value of said high pressure source to release said second plunger means, conduit means in communication with said housing proximate said sealing means for conducting high pressure fluid from said housing upon disengagement of said sealing means resulting from release of said holding means, and means adapted to be selectively installed relative to said housing as a replacement for said first plunger means to thereby vary the effective fluid pressure area of said first plunger means, whereby said holding means may release at a different pressure.

* * * * *